United States Patent Office 2,781,577
Patented Feb. 19, 1957

2,781,577

METHOD OF MAKING CORROSION RESISTANT SOLDERED JOINTS

William James Smellie, Sheffield, England, assignor to The Sheffield Smelting Company Limited, Sheffield, England No Drawing. Application August 28, 1953, Serial No. 377,223

2 Claims. (Cl. 29—492)

In the past considerable development work has been undertaken on the soldering of aluminium and its alloys, but no fully successful commercial or industrial process has resulted.

The main barrier to successful soldering is the layer of aluminium oxide which is present on the surface of the aluminium, and which must be removed before alloying with the underlying parent metal can be achieved.

Another difficulty that arises, once a soldered joint has been made, is to ensure that its corrosion resistance is good enough to withstand corrosive conditions in service.

Up to the present, known soldering methods have failed to overcome fully either or both of these two main difficulties.

One method, known for some time, of removing the oxide layer on the surface of aluminium and its alloys, is to mechanically abrade or scrape the surface. This method is tedious, wasteful, and suffers from the defect that the removal is apt to be non-uniform and seldom complete, and further, before the solder can be applied subsequent to the mechanical abrasion the surface of the aluminium can again form an oxide layer.

Another method of removing the oxide layer on aluminium is by supersonic agitation at the time of applying molten solder by a special soldering iron vibrating very rapidly. This method, though better than the mechanical abrasion, is not entirely satisfactory in that the oxide layer forms a sort of scum as it is broken down, and this scum has to be moved by a hand-rubbing action with the soldering iron, and some of it may be entrapped in the joint causing early failure in service. Moreover, solders used with this method do not give mechanically sound joints under corrosive conditions.

Several solders have been proposed in the past, but generally there is not detailed a satisfactory process for making the soldered joints, the pre-requisite for which is complete removal of the oxide layer present on the surface of aluminium and its alloys. Moreover, most of these solder compositions fail to make joints which are mechanically sound under corrosive conditions met with in service.

The only satisfactory method of joining aluminium and its alloys, apart from welding, has been the use of brazing alloys consisting of aluminium alloyed with 5-13% silicon. These brazing alloys all have a high melting range of approximately 570°-625° C. and consequently cannot be applied to many of the aluminium alloys such as duralumin which has a melting point below that of the aluminium silicon brazing alloys. Moreover, it is very difficult to braze successfully by torch thin sections of aluminium and aluminium alloys, owing to the danger of fusing the sections because of the high melting range of these brazing alloys. Consequently a process operating at low temperatures is necessary for the joining of thin sections of aluminium and its alloys.

The main object of the present invention is to overcome these limitations and provide a satisfactory workable method of making soldered joints which are mechanically sound under corrosive conditions specified below.

According to the present invention there is provided a method of jointing metal parts by soldering, at least one of which parts consists of a metal selected from the group consisting of aluminium and its alloys, which method comprises the step of applying to said parts a flux having a composition such that on melting by heating it dissolves the aluminium oxide and reacts chemically to produce a metal or alloy layer on the metal part cleaned by the applied flux, thus preventing reoxidation of the cleaned surface and forming a protective layer, then applying a suitable solder which unites with the metal or alloy layer to form a joint, the corrosion resistance of which depends upon the previously deposited metal or alloy layer and upon the solder used.

In one method of carrying out the invention the flux is applied as a paste to the parts to be jointed followed by the application of the solder. The solder unites with the metal or alloy layer which has been formed by the reaction of the flux with the metal parts and forms a joint, the corrosion resistance of which depends upon the previously deposited metal or alloy layer and upon the solder used.

Alternatively, the flux may be applied by means of the solder rod which has been coated by dipping the heated rod into the powdered flux. In the jointing operation the flux melts off the solder rod, flows on to the heated surface area of the joint and proceeds to function as described above.

The soldering may be done by torch heating which is the simplest and most commonly applicable method of heating. Alternative methods of heating such as furnace or high frequency can be used, in both of which cases the assembly is coated with flux and the solder placed in position before passing into the furnace or applying the high frequency heating. Another method is by dipping the articles to be joined into a layer of molten flux lying on top of a bath of molten solder contained in a heated receptacle.

The mechanism of the flux reaction briefly is that suitable chlorides which form the basis of the flux provide a mixture with a melting point of approximately 250-500° C. When the flux is heated, the heavy metal chlorides e. g. zinc and/or cadmium in the flux react with the aluminium oxide on the surface of the aluminium (or aluminium alloy) to form aluminium salts and deposit a layer of zinc or zinc-cadmium alloy or cadmium. At the operating temperature (approximately between 250 and 500° C.) the fluoride content of the flux dissolves the aluminium salts thus formed so that the precipitated metal (zinc or zinc-cadmium or cadmium) can melt and form a molten layer over the aluminium and be protected completely against oxidation by a liquid flux stable between operating temperatures and the melting point of aluminium.

It may be desirable in certain instances to incorporate small amounts of certain halides or other salts or of powdered metals into the flux to modify the physical characteristics of the flux or to modify the composition of the molten alloy layer formed on the aluminium. These possible additions are merely refinements and do not affect the basic function and mechanism of the flux.

In combination with the specific fluxes, special compositions of solder give very satisfactory results, and in addition some known compositions of solder already tried become useable where previously they were either unsuccessful or of very limited application.

The developmental work subsequent to the filing of the British provisional application No. 13837/51 has shown that certain alloys rich in zinc are superior to the cadmium rich alloys, and particularly so to tin or tin/zinc alloys where tin predominates, in that they withstand a wider range of corrosive conditions.

I have also found that alloys containing substantial amounts of aluminium or magnesium, e. g. certain aluminium/magnesium alloys, are not susceptible to the type of breakdown occurring with the tin rich solders where the presence of aluminium leads to rapid failure by water at 100° C., as described in the said provisional specification.

Fluxes suitable for the present invention are of the following three types. It is to be understood that the total parts by weight in any one composition within the range of the general composition shall total 100 parts by weight.

*Type I.*—General composition:

| | Parts by weight |
|---|---|
| Potassium chloride | up to 70 |
| Lithium chloride | up to 70 |
| Sodium chloride | up to 45 |
| Zinc chloride | up to 20 |
| Lithium fluoride | up to 20 |
| Manganous chloride (Optional) | up to 60 |

Caesium chloride and rubidium chloride may replace separately or together, lithium chloride in part up to 40 parts by weight.

A particular composition of Type I will have the following constituents:

| | Parts by weight |
|---|---|
| Potassium chloride | 37 |
| Lithium chloride | 20 |
| Sodium chloride | 25 |
| Zinc chloride | 9 |
| Lithium fluoride | 9 |

*Type II.*—General composition as for Type I with the addition of up to 20 parts by weight of cadmium chloride.

A particular composition of Type II will have the following constituents:

| | Parts by weight |
|---|---|
| Potassium chloride | 40 |
| Lithium chloride | 39 |
| Sodium chloride | 3 |
| Zinc chloride | 4 |
| Cadmium chloride | 6 |
| Lithium fluoride | 8 |

Alternatively cadmium chloride may entirely replace zinc chloride with a maximum of 20 parts by weight of cadmium chloride.

*Type III.*—General composition as for Type I or II with the addition of up to 10 parts by weight of stannous chloride, lead chloride and antimony trichloride.

To any of the above fluxes may be added up to 10 parts by weight of halides of the following elements (except where already included): potassium, lithium, sodium, zinc, magnesium, barium, calcium, copper, nickel, silver, iron, bismuth and manganese. In addition the metal chlorides may be replaced wholly or partly by the corresponding bromides or iodides.

I have found that the solder compositions hereinafter described make joints which are mechanically sound under some or all of the following corrosive conditions:

(a) Immersion in ordinary water at 100° C.—100 hours minimum
(b) Immersion in cold 3% salt solution—1000 hours minimum
(c) Air saturated with water vapour at 100° C.—100 hours minimum
(d) Normal indoor atmosphere—2 years minimum Mechanically sound joints satisfying all the conditions (a) to (d) can be made by applying flux of either Type I, II or III, heating until a layer of molten metal is formed, and then applying alloys of preferred compositions:

| | Percent by weight |
|---|---|
| Aluminium | 66.67 |
| Magnesium | 33.33 |
| Zinc | 95 |
| Silver | 5 |
| Zinc | 90 |
| Silver | 5 |
| Aluminium | 5 | and alloys within the range

| | Percent by weight |
|---|---|
| Aluminium | 10–75 |
| Magnesium | 25–75 | with the aluminium oxide on the surface of the aluminium

| | |
|---|---|
| Silicon | 0–15 |
| Copper | 0–20 |
| Cadmium | 0–20 |
| Silver | 0–10 | to which small percentages of various metals e. g. sodium, tin, manganese, nickel, antimony, bismuth may be added; and alloys within the range

| | Percent by weight |
|---|---|
| Zinc | 50–100 |
| Magnesium | 0–10 |
| Aluminium | 0–30 |
| Cadmium | 0–50 |
| Silver | 0–20 |
| Lead | 0–20 | to which small percentages of various metals e. g. copper, sodium, tin, silicon, manganese, nickel, antimony, bismuth, may be added.

Joints satisfying conditions (c) and (d) can be made with flux of Type I, II or III, used in conjunction with solders containing cadmium or tin of the following preferred compositions.

| | Percent by weight |
|---|---|
| Cadmium | 85 |
| Zinc | 10 |
| Silver | 5 |
| Cadmium | 70 |
| Zinc | 25 |
| Aluminium | 5 |
| Tin | 95 |
| Silver | 5 |
| Tin | 90 |
| Zinc | 10 | and alloys within the range

| | Percent by weight |
|---|---|
| Silver | 0–10 |
| Zinc | 0–50 |
| Magnesium | 0–30 |
| Aluminium | 0–30 |
| Cadmium | Balance | to which small amounts of copper, sodium, silicon, tin, manganese, antimony, bismuth and lead may be added; and alloys in the range

| | Percent by weight |
|---|---|
| Zinc | 0–50 |
| Lead | 0–50 |
| Cadmium | 0–20 |
| Silver | 0–20 |
| Antimony | 0–10 |
| Tin | Balance | to which small amounts of copper, sodium, tin, silicon, manganese, antimony and bismuth may be added.

The high corrosion resistance of the joints can be increased by a surface treatment such as painting with lacquer or dipping in chemical solution to form a passive layer so as to meet the special conditions where no corrosion products whatsoever can be tolerated.

Metals and alloys which may be jointed to aluminium or aluminium alloys by the method of the present invention include the precious metals, nickel/silver alloys, copper, copper alloys, and steel.

The present invention includes a metal assembly or structure having parts which have been joined by soldering by the method hereinbefore described.

I claim:

1. A method of making corrosion resistant soldered joints between metal parts, at least one of which parts consists of a metal selected from the group consisting of aluminium and its alloys, which method comprises the step of applying to said parts a flux having a melting point between 250° and 500° C., and consisting of effective amounts of potassium chloride, lithium chloride, sodium chloride, lithium fluoride and at least one salt selected from the group consisting of zinc chloride and cadmium chloride, the potassium and lithium chloride each being present in an amount not exceeding 70% by weight, the zinc chloride, cadmium chloride and lithium fluoride each being present in an amount not exceeding 20% by weight and the sodium chloride being present in an amount not exceeding 45% by weight, which flux on melting by heating produces a metallic coating on the metal part cleaned by the applied flux, and then applying a solder consisting of zinc 95% by weight, silver 5% by weight.

2. A method of making corrosion resistant soldered joints between metal parts, at least one of which parts consists of a metal selected from the group consisting of aluminium and its alloys, which method comprises the application to said parts of a flux having a melting point between 250° to 500° C. and consisting of the following constituents:

| | Percent by weight |
|---|---|
| Potassium chloride | 37 |
| Lithium chloride | 20 |
| Sodium chloride | 25 |
| Zinc chloride | 9 |
| Lithium fluoride | 9 | followed by the application of a solder consisting of the following constituents:

| | Percent by weight |
|---|---|
| Zinc | 95 |
| Silver | 5 |

References Cited in the file of this patent

UNITED STATES PATENTS

| 597,111 | Gooch | Jan. 11, 1898 |
| 648,831 | Bates | May 1, 1900 |
| 943,164 | Schoop | Dec. 14, 1909 |
| 1,653,482 | Spengler | Dec. 20, 1927 |
| 2,052,740 | Barber et al. | Sept. 1, 1936 |
| 2,296,442 | Horowitz | Sept. 22, 1942 |
| 2,299,164 | Miller | Oct. 20, 1942 |
| 2,481,053 | Wassermann | Sept. 6, 1949 |
| 2,646,620 | Geddes et al. | July 28, 1953 |

OTHER REFERENCES

"Aluminum Soldering," Supplement to the Journal of the American Welding Society, Sept. 1940, pages 313-S to 322-S.